United States Patent [19]

McCurry

[11] 4,132,283
[45] Jan. 2, 1979

[54] SYSTEM TO SUPPLEMENT ENGINE POWER

[76] Inventor: Jere L. McCurry, 3915 Kenwood Dr., Stow, Ohio 44224

[21] Appl. No.: 879,147

[22] Filed: Feb. 21, 1978

Related U.S. Application Data

[63] Continuation-in-part of Ser. No. 710,462, Aug. 8, 1976, abandoned.

[51] Int. Cl.² .............................................. B60K 25/02
[52] U.S. Cl. ................................. 180/66 R; 60/417; 192/3 R
[58] Field of Search ............. 180/66 R, 66 B, 65 A, 180/54 C, 54 R; 60/417, 414; 192/3 R

[56] References Cited

U.S. PATENT DOCUMENTS

| | | | |
|---|---|---|---|
| 1,036,743 | 8/1912 | Sundh | 180/66 R |
| 1,347,805 | 7/1920 | Feagan | 60/412 |
| 2,186,748 | 1/1940 | Berger | 60/417 |
| 2,256,302 | 9/1941 | Wehmeier | 180/66 B |
| 2,544,606 | 3/1951 | Mallory | 180/66 B |
| 2,755,898 | 7/1956 | Bell | 60/414 |
| 2,929,198 | 3/1960 | Crocchi | 60/626 |

*Primary Examiner*—David M. Mitchell
*Attorney, Agent, or Firm*—Mack D. Cook, II

[57] ABSTRACT

A system for using hydraulic fluid pressure to supplement vehicle engine power. The system includes a fluid pump selectively coupled during vehicle deceleration to the power output mechanism of the engine. Low pressure fluid from a reservoir is pumped into an accumulator. Thereafter, fluid under high pressure is transmitted during vehicle acceleration to a fluid motor selectively coupled to a drive shaft for powering the vehicle wheels.

3 Claims, 4 Drawing Figures

SYSTEM TO SUPPLEMENT ENGINE POWER

This application is a continuation-in-part of U.S. Application Ser. No. 710,462, filed Aug. 8, 1976.

BACKGROUND OF THE INVENTION

The present invention relates to a system for using high pressure hydraulic fluid to supplement vehicle engine power. Low pressure fluid is selectively accumulated during vehicle deceleration. Thereafter, the fluid pressure is selectively released under high pressure for powering the vehicle wheels during acceleration.

Systems for supplementing vehicle engine power are not new. In the prior application, Ser. No. 710,462, prior art patents selected from the art found in Class 60, subclasses 625, 626, 628, 698, 708, 709, 712 and 413; and Class 74, subclass 720, were noticed by the inventor. During examination of the prior application, the Examiner cited prior art patents from the art found in Class 60, subclasses 339, 412, 414, 626 and 628; Class 180, subclasses 65A, 66B and 66R; and Class 192, subclass 3R.

It has now been found that an operable system for the absorption and return of inertial energy generated during vehicle operation need not be complex, may be relatively inexpensive to install, operate and maintain using commercially available components, and will satisfactorily perform within realistically chosen and reasonable operating parameters.

SUMMARY OF THE INVENTION

The object of the invention is to provide an improved system for using hydraulic fluid pressure to supplement vehicle engine power.

It is a further object of the invention to provide a system to supplement vehicle engine power by the absorption of inertial energy generated during vehicle deceleration, with a resultant increase in fuel economy, and a return thereof during vehicle acceleration, with a resultant increase in the efficiency of vehicle performance.

The invention has been conceived with the specific object of improving the performance of smaller, low-powered, fuel-saving passenger cars by providing a significant supplementary accelerative force at the most critical time, starting motion from a stopped position, when fuel consumption and lack of performance are most noticeable, and by minimizing the performance loss during stop-and-go driving in traffic, absorbing the inertial energy generated by braking or stopping and returning the energy for starting.

These and other objects of the invention, and further advantages thereof, will be apparent in view of the description of the various embodiments thereof, as set forth below.

In general, a system according to the invention is used in combination with a vehicle having at least one pair of driven wheels, an engine having a power output shaft, a transmission unit connected with a power output shaft, and a drive shaft rotated by the transmission unit, whereby engine power is applied to axles to drive the wheels.

The system for use of hydraulic fluid pressure to supplement the vehicle engine power includes an engine throttle mechanism signal circuit operator controlled by an accelerator component and a wheel braking mechanism signal circuit operator controlled by a brake component.

The system also includes a fluid pump for coupling with the engine power output shaft, a reservoir for supplying low pressure fluid to the pump, an accumulator for storing fluid from the pump under high pressure, and a fluid motor for coupling with the vehicle drive shaft when receiving high pressure fluid from the accumulator.

The system provides that the fluid pump is coupled with the engine power output shaft only when the wheel braking mechanism signal circuit has been actuated by movement of the brake component. The system further provides that the fluid motor is coupled with the drive shaft only when the fluid pressure in the accumulator and at the fluid motor is above a predetermined value.

When the system is used with a vehicle having an operator controlled (manual) transmission unit, it is further provided that the fluid motor is coupled with the drive shaft only when primary torque is being applied from the vehicle engine.

DETAILED DESCRIPTION OF THE INVENTION

Figure 1:
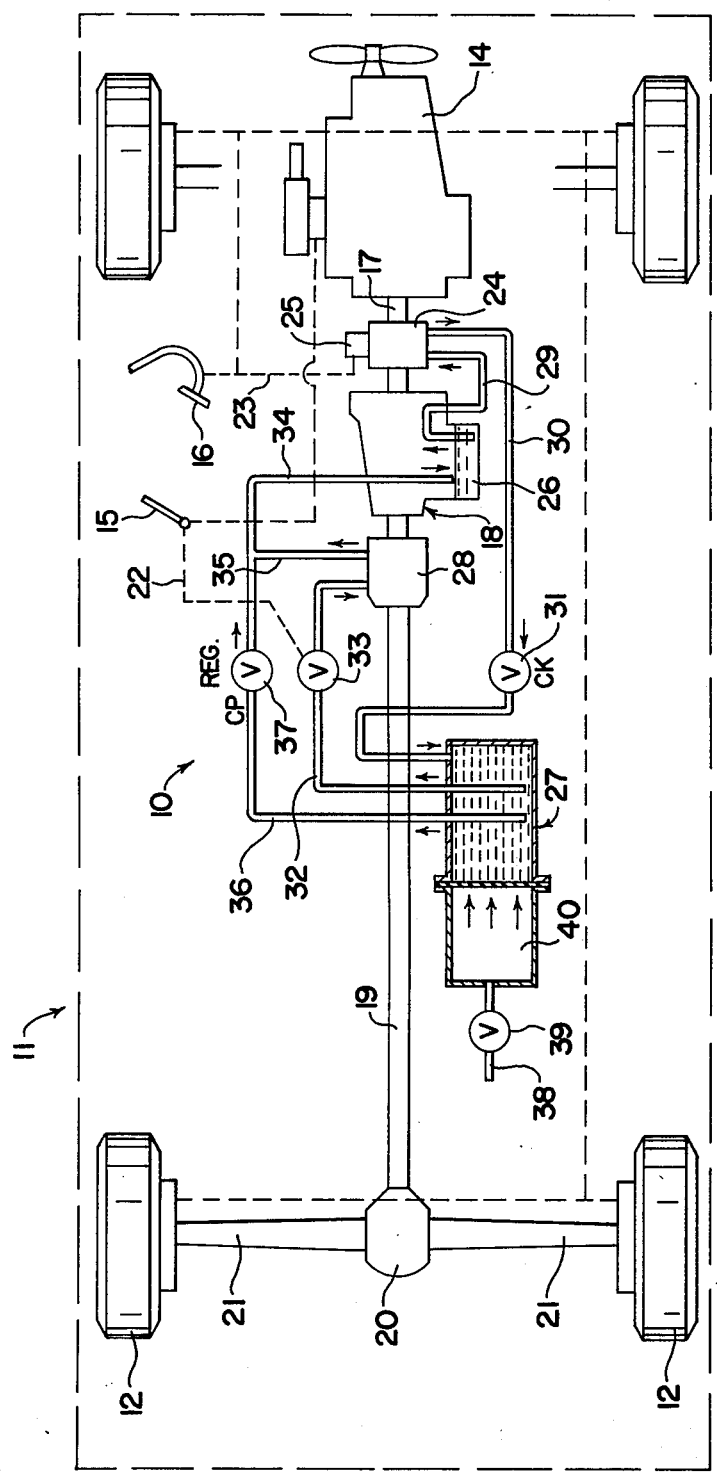
FIG. 1 is a plan schematic view showing a preferred embodiment of a system according to the invention used in combination with a vehicle.

A system for using hydraulic fluid pressure to supplement vehicle engine power is referred to generally by the numeral 10. A system 10 has components installed on a vehicle referred to generally by the numeral 11, either as original equipment or as a conversion or accessory addition.

The vehicle 11 will have at least one pair of driven or powered axle mounted wheels 12. The vehicle engine, which may be an internal combustion motor, is indicated at 14. The engine 14 is controlled by a conventional throttle or speed regulation mechanism including an operator controlled accelerator component or foot pedal indicated at 15. The vehicle 11 is decelerated, slowed or stopped by a conventional wheel braking mechanism including an operator controlled brake component or foot pedal indicated at 16.

Referring to FIG. 1, the vehicle enging 14 has a rotating power output shaft indicated at 17. The shaft 17 is connected with a conventional power transmission unit indicated at 18, either operator controlled (manual) or automatic, for selectively varying the torque output from the engine 14. The transmission unit 18 rotates a conventional drive shaft indicated at 19. The drive shaft 19 may terminate at a conventional differential unit indicated at 20 for driving the axles indicated at 21 mounting the wheels 12.

The actuation or control components of a system 10 include an engine throttle mechanism signal circuit 22 operator controlled as by the accelerator pedal 15, and a wheel braking mechanism signal circuit 23 operator controlled as by the brake pedal 16.

The mechanical components of the system 10 include a fluid pump 24 selectively coupled to the power output shaft 17, a control means 25 connected to the wheel braking mechanism signal circuit 23 for actuating the pump 24, a reservoir 26 for supplying low pressure hydraulic fluid to the pump 24, an accumulator 27 for storing hydraulic fluid from the pump 24 under high pressure, and a fluid motor 28 receiving fluid from the accumulator 27 and selectively coupled to the drive shaft 19.

The piping and valve components of a system 10 include a low pressure fluid supply conduit 29 connecting the reservoir 26 with the pump 24, a fluid delivery conduit 30 with a check valve 31 connecting the pump 24 with the accumulator 27, a high pressure fluid delivery conduit 32 with an operating valve 33 connected to the engine throttle mechanism signal circuit 22 and connecting the accumulator 27 with the fluid motor 28, a fluid return conduit 34 communicating with the reservoir 26, another fluid return conduit 35 connecting the motor 28 with return conduit 34, still another fluid return conduit 36 with a pressure regulating valve 37 connecting the accumulator 27 with the return conduit 34, and preferably, a conduit 38 and an operating valve 39 for charging the pressure chamber 40 in the accumulator 27 with a compressible atmosphere.

The fluid pump 24 incorporates therein an assembly for selectively engaging the engine power output shaft 17 so as to transmit fluid supplied through conduit 29 into conduit 30. The pump 24 is actuated by the control means 25 only when the wheel braking mechanism signal circuit 23 has been actuated by operator movement of the brake pedal 16.

As shown, the fluid reservoir 26 is also the fluid sump for an automatic transmission unit 18. Alternatively, the reservoir 26 could be a discrete component located separately from the transmission unit 18.

The fluid motor 28 incorporates therein an assembly for selectively engaging the vehicle drive shaft 19 so as to apply supplementary power thereto. The assembly is responsive to the pressure of the fluid supplied from the accumulator 27 through conduit 32 on the opening of the valve 33 by the engine throttle mechanism signal circuit 22. The valve 33 is opened only when the signal circuit 22 has been actuated by operator movement of the accelerator pedal 15. Preferably, the motor 28 is coupled with the drive shaft 19 only when the fluid pressure in the accumulator 27 is maintained above a predetermined value. When the pressure in the accumulator 27 is exhausted below a predetermined value, the fluid motor 28 is constructed so as to be disengaged from the drive shaft 19.

Figure 2:
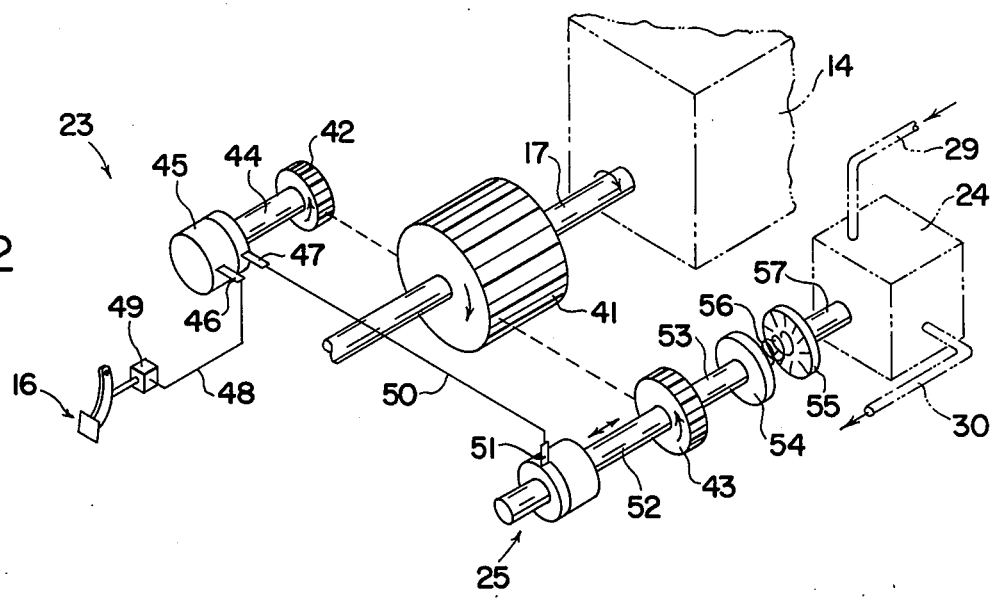
FIG. 2 is an exploded perspective view showing components of the system used to couple a fluid pump with an engine power output shaft.
Figure 3:
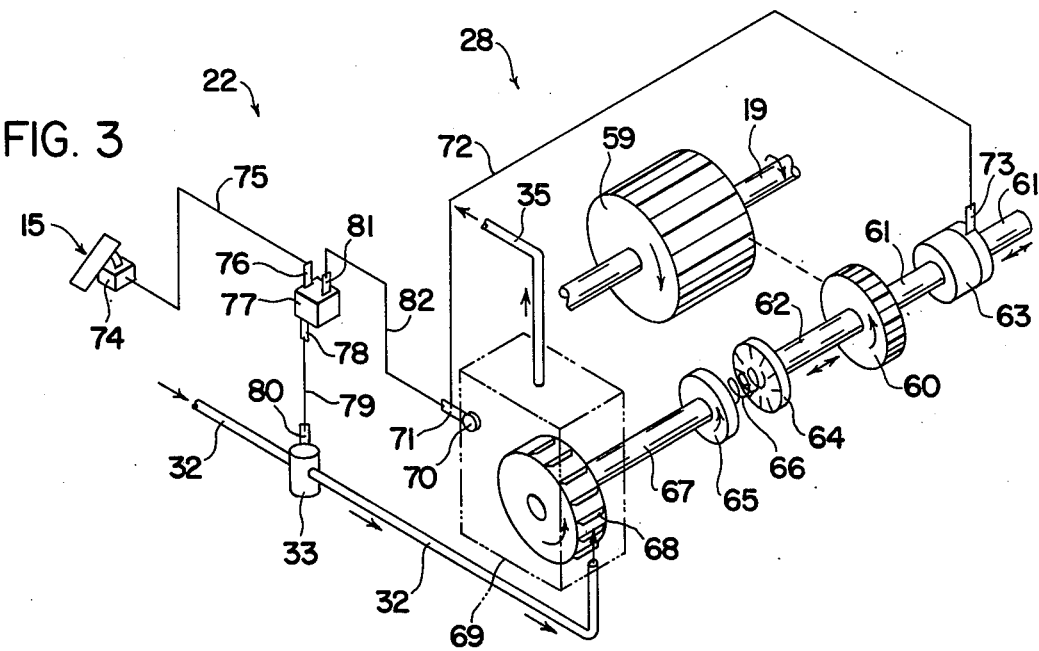
FIG. 3 is another exploded perspective view showing components of the system used to couple a fluid motor with a vehicle drive shaft; and, FIG. 4 is a schematic view showing components of the system used when a vehicle has an operator controlled (manual) transmission unit.
Figure 4:
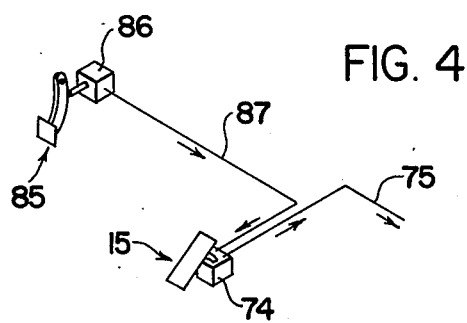

Further reference may be made to FIGS. 2, 3 and 4 for a further showing of details of embodiments of various components comprising a system 10 according to the invention.

As set forth above, a system 10 includes a brake pedal 16 to control a braking mechanism for the wheels of a vehicle 11, a power output shaft 17 driven by a vehicle engine 14, a wheel braking mechanism signal circuit 23 operator controlled and positively actuated by depression of the brake pedal 16, a fluid pump 24 adjacent the power output shaft 17, and a control means 25 connected to the signal circuit 23 for engaging the fluid pump 24 with the output shaft 17 when the brake pedal 16 is depressed.

As shown in detail in FIG. 2, a ring gear 41 is secured to and positioned coaxially around the engine power output shaft 17. The ring gear 41 has teeth in constant meshing engagement with adjacent rotary gears 42 and 43.

The smaller rotary gear 42 is carried by a shaft 44 connected to the rotor (not shown) of an electrical centrifugal switch 45 intended to be closed when the engine power output shaft 17 is rotating faster than an engine idle speed. The centrifugal switch 45 has an input terminal 46 connected internally to the switch rotor. The centrifugal switch 45 also has a stator (not shown) connected internally to an output terminal 47. The centrifugal switch input terminal 46 is connected by wiring 48 to the output terminal of an electrical signal switch 49. The signal switch 49 is intended to be closed when the brake pedal 16 is depressed and opened when the brake pedal 16 is released. The centrifugal switch output terminal 47 is connected by wiring 50 through an input terminal 51 to the coil (not shown) of an electrical solenoid constituting the control means 25.

The larger rotary gear 43 is carried by a slidably journaled shaft having dual ends 52 and 53. Gear shaft end 52 is operatively connected to the core (not shown) of the solenoid control means 25. Gear shaft end 53 carries the driving plate 54 of a clutch mechanism for a fluid pump 24. The axially moving clutch plate 54 is normally separated from a driven clutch plate 55 by a clutch spring 56. The axially stationary clutch plate 55 is carried by the input shaft 57 of the fluid pump 24 (shown in chain lines).

An electrical signal generated by depression of the brake pedal 16 will be transmitted by the signal switch 49 through the centrifugal switch 45 when the engine 14 is running above an idling speed to actuate the solenoid control means 25 and engage the fluid pump 24 with the engine output shaft 17.

As set forth above, a system 10 also includes an accelerator pedal 15 to control the vehicle engine 14, a drive shaft 19 for the axles 21 of the driven vehicle wheels 12, an engine throttle mechanism signal circuit 22 controlled and positively actuated by depression of the accelerator pedal 15, a fluid motor 28 adjacent the drive shaft 19, and a fluid conduit 32 to the motor 28 with an operating valve 33 therein to transmit high pressure fluid from an accumulator 27 when the accelerator pedal 15 is depressed. The fluid motor 28 engages with the drive shaft 19 when the fluid pressure in the accumulator 27 is above a predetermined value.

As shown in detail in FIG. 3, a ring gear 59 is secured to and positioned coaxially around the drive shaft 19. The ring gear 59 has teeth in constant meshing engagement with an adjacent rotary gear 60. Rotary gear 60 is carried by a slidably journaled shaft having dual ends 61 and 62. Gear shaft end 61 is operatively connected to the core (not shown) of an electrical solenoid 63. Gear shaft end 62 carries the driven plate 64 of a clutch mechanism for the fluid motor 28. The axially movable clutch plate 64 is normally separated from a driving clutch plate 65 by a clutch spring 66. The axially stationary clutch plate 65 is carried by the output shaft 67 of a rotor 68 for the fluid motor 28.

The fluid motor rotor 68 is housed within a chamber 69 (shown in chain lines) to receive high pressure fluid delivered through the conduit 32. The rotor chamber 69 has associated therewith an electrical switch 70 responsive to fluid pressure within the chamber 69. The pressure switch 70 has an output terminal 71 to transmit an electrical signal when the pressure of the fluid in rotor chamber 69 is above a calibrated value. The pressure switch output terminal 71 is connected by wiring 72 through an input terminal 73 to the coil (not shown)of the electrical solenoid 63.

An electrical switch 74 is intended to be closed when the accelerator pedal 15 is depressed and opened when the accelerator pedal 15 is released. The output terminal of the signal switch 74 is connected by wiring 75 to the primary input terminal 76 of an electrical relay 77. The output terminal 78 of the signal relay 77 is connected by wiring 79 to the input terminal 80 of an electrically actuated fluid control valve constituting the operating valve 33. Absence of a signal from the output terminal 78 will maintain or return the operating valve 33 in or to a closed condition. A secondary input terminal 81 of the signal relay 77 is further connected by wiring 82 to the pressure switch output terminal 71. The signal 77 is internally constructed so that after a predetermined delay of short duration, a signal from the pressure switch 70 must be received through secondary input terminal 81 for transmission of a signal from the accelerator switch 74 through the relay 77 to open the operating valve 33.

An electrical signal generated by depression of the accelerator pedal 15 will be transmitted by the signal switch 74 through the signal relay 77 to open the operating valve 33 and engage the fluid motor 28 with the vehicle drive shaft 19 when the fluid pressure in the accumulator 27 is above a predetermined value, as determined by calibration of the rotor chamber pressure switch 70.

As set forth above, the power transmission unit 18 between the power output shaft 17 and the drive shaft 19 may be either operator controlled (manual) or automatic. It has been determined that a vehicle 11 with a manual transmission 18 and equipped with a system 10 should have a means to assure that the primary torque of the engine 14 is applied simultaneously with the secondary torque of the pressure fluid in accumulator 27.

As shown in FIG. 4, a vehicle transmission clutch foot pedal is indicated at 85. An electrical signal switch 86 is intended to be closed when the clutch pedal 85 is released to the point of full power transmission contact and opened when the clutch pedal 85 is partially or fully depressed. The output terminal of the clutch signal switch 86 is connected by wiring 87 to the signal switch 74, normally responsive to the accelerator pedal 15. The signal switch 74 is internally modified so that a signal will be transmitted through wiring 75 to the signal relay 77 only when a synchronizing signal has been transmitted from signal switch 86.

It will be understood that other changes and modifications could be made to components of the system 10 without departing from the inventive subject matter as disclosed and claimed herein. For example, the fluid pump 24 could be driven from an engine power output shaft 17 as by a belt drive from a forwardly projecting shaft powering the engine radiator fan. Or, in a vehicle having power steering, the fluid pump therefor could be suitably modified to allow for use of a control means 25 and actuation thereof by a brake mechanism signal circuit 23. In a vehicle having front wheel drive, a belt driven fluid pump 24 could be used and the fluid motor 28 could be coupled with a drive shaft 19 extending between a transmission unit 18 and a front differential 20.

SUMMARY OF THE OPERATION

The system 10 will supplement the power of an engine 14 by causing the fluid pump 24 and accumulator 27 to absorb a portion of the inertial energy of vehicle deceleration during operation of the braking mechanism for the vehicle wheels 12. During operation of the throttle mechanism for the engine 14, a portion of the absorbed inertial energy is returned from the accumulator 27 to the fluid motor 28. If the absorbed inertial energy at any time exceeds the capacity of the accumulator 27, the pressure regulating valve 37 will open and return a portion of the fluid to the reservoir 26.

What is claimed is:

1. In a system for using high pressure hydraulic fluid to supplement vehicle engine power on a vehicle having at least one pair of driven wheels and an engine having a power output shaft and a drive shaft for the axles of said driven wheels and a wheel braking mechanism, said system further having an accelerator pedal to control said engine, a brake pedal to control said wheel braking mechanism, a reservoir for supplying low pressure hydraulic fluid, and an accumulator for storing hydraulic fluid under high pressure, the improvements comprising:

a power transmission unit connected to said engine power output shaft for selectively varying the torque output from said engine and rotating said drive shaft;

a wheel braking mechanism signal circuit operator controlled and positively actuated by depression of said brake pedal;

a fluid pump between said engine and said power transmission unit adjacent said power output shaft;

a control means connected to said wheel braking mechanism signal circuit for engaging said fluid pump with said power output shaft to transmit low pressure fluid from said reservoir to said accumulator when said brake pedal is depressed;

an engine throttle mechanism signal circuit controlled and positively actuated by depression of said accelerator pedal;

a fluid motor between said power transmission unit and said axles of said driven wheels adjacent said drive shaft; said fluid motor having an assembly for selectively engaging said drive shaft so as to apply supplementary power thereto; and a fluid conduit from said accumulator to said fluid motor assembly with an operating valve therein and connected to said engine throttle mechanism signal circuit to transmit high pressure fluid from said accumulator to said fluid motor assembly when said accelerator pedal is depressed, said fluid motor assembly engaging with said drive shaft when the fluid pressure in said accumulator is above a predetermined value.

2. A system according to claim 1, wherein said reservoir is also the fluid sump of an automatic transmission unit.

3. A system according to claim 1, wherein said transmission unit is operator controlled having a clutch pedal with a signal circuit so that said fluid motor assembly engages with said drive shaft only when primary torque is being applied thereto from said vehicle engine.

* * * * *